(No Model.)

A. TEST.
SOD CUTTER.

No. 286,652. Patented Oct. 16, 1883.

Witnesses,
John P. Deal
Aldison H. Study

Inventor:
Alpheus Test
by W. J. Dennis
Attorney

UNITED STATES PATENT OFFICE.

ALPHEUS TEST, OF RICHMOND, INDIANA.

SOD-CUTTER.

SPECIFICATION forming part of Letters Patent No. 286,652, dated October 16, 1883.

Application filed May 17, 1883. (No model.)

*To all whom it may concern:*

Be it known that I, ALPHEUS TEST, a citizen of the United States, residing at Richmond, in the county of Wayne and State of Indiana, have invented certain new and useful Improvements in Sod-Cutters, of which the following is a specification, reference being had therein to the accompanying drawings.

My invention relates to that class of sod-cutters that are operated by horse-power, and by which the sod is cut in strips or ribbons of uniform width and thickness.

My invention consists in the employment of vertical crescent-shaped knives or cutters in connection with a horizontal cutter, by which the edges of the strips of sod are cut evenly and smoothly immediately in advance of the cutting which separates the sod from the ground.

It further consists in the employment of a guide-plate attached to the runner of a sod-cutter, which, operated by means of a guide-rod, enables the operator to keep the cutters close against the shoulder of the previous cut, and thus produce strips of even width with straight edges.

These devices are additional improvements upon the sod-cutter upon which I obtained Letters Patent No. 272,496, dated February 20, 1883, which are referred to herewith.

Figure 1:
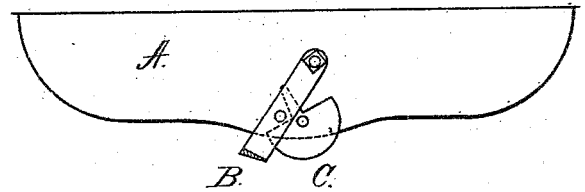
Figure 2:
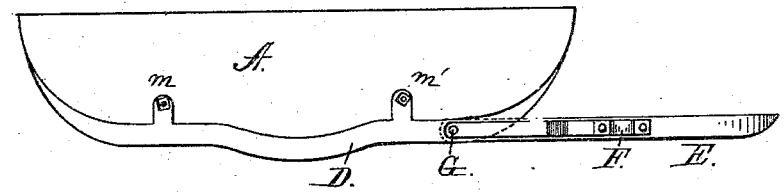
Figure 3:
Figure 4:
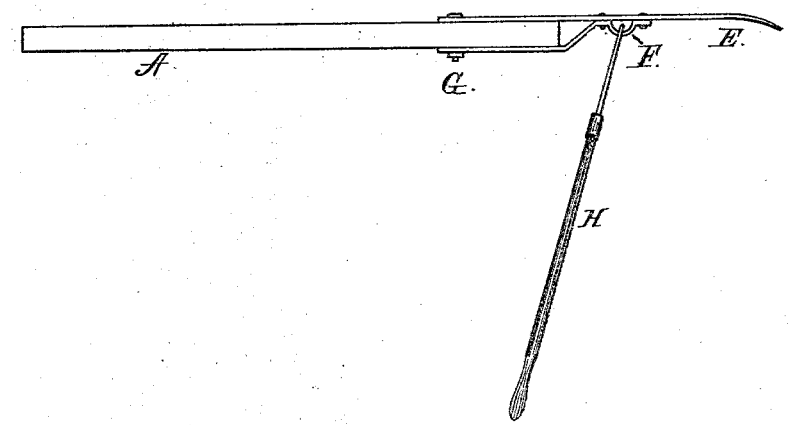

In the drawings which accompany this specification, and form a part thereof, Figure 1 is an elevation of one of the runners, which carries the cutters, showing the same, and their attachment to the inside perpendicular surface of the runner. Fig. 2 is an elevation of another one of the runners, showing a shoe or supplemental runner having attached and connected thereto a guide. Fig. 3 is a plan view of the handle which is used to operate the guide. Fig. 4 is a top view of one of the runners and the guide attached, showing their connection and relative position, and also the manner of operating the guide by the handle.

In Fig. 1, A represents one of the runners of a sod-cutter; B, the stirrup-shaped knife, fastened to the inside perpendicular surface of said runner A, and C is a crescent-shaped cutter secured to the surface of the runner just in front of and on a line with the vertical bar of the cutter B, and so arranged as to cut the edge of the strip to be removed of a proper thickness, and to produce a smooth vertical shoulder upon the strip, as well as on the remaining turf.

In Fig. 2, A represents a similar runner, the two forming the sled or framing carrying the cutting and guiding devices. To this runner A a supplemental shoe is attached, as fully described in Letters Patent No. 272,496, dated February 20, 1883. To this shoe D is hinged a guide, E, near its forward end, which is allowed a vertical motion at its front end, and may be suspended to the framing A, if required. The rear end of the guide E is formed in two pieces, which are joined immediately in front of the end of the runner A, and the pieces of which embrace the runner on its outer and inner surface, secured to the same by a screw-bolt at G, Fig. 4. The guide E is also provided with a loop, F, to receive the crook of the handle H, which, in the hands of an operator, is used to hold the runner and the guide close against the shoulder of the previous cut, thus producing strips of even width with straight edges.

I am aware that the supplemental shoe D and the stirrup-shaped knife B are already in use, as also the runners A A with curved bearing-faces. These I do not claim; but What I do claim as new, and desire to secure by Letters Patent, is—

1. In a sod-cutter, the crescent-shaped cutter C, combined with and attached to the runner A in the manner and for the purposes herein set forth.

2. The guide E and its loop F in combination with the runner A and handle H, all substantially as and for the purpose set forth.

In testimony whereof I affix my signature in presence of two witnesses.

ALPHEUS TEST.

Witnesses:
 JOHN P. DEAL,
 W. T. DENNIS.